United States Patent Office 3,043,886
Patented July 10, 1962

3,043,886
DIARYLMETHANES
Carl Serres, Jr., Hammond, Ind., and Ellis K. Fields, Chicago, Ill., assignors to Standard Oil Company, Chicago, Ill., a corporation of Indiana
No Drawing. Filed Aug. 21, 1959, Ser. No. 835,172
10 Claims. (Cl. 260—649)

This invention relates to the preparation of diarylmethanes, and more specifically pertains to the conversion of a polyarylmethane to a diarylmethane.

In the preparation of diarylmethanes by the acid-catalyzed condensation of aromatic hydrocarbons with formaldehyde or substances which liberate formaldehyde such as para-formaldehyde, trioxymethylene and the like, or by the Lewis acid catalyzed condensation of a benzyl halide with an aromatic hydrocarbon, there is formed as a by-product a substantial amount of high boiling, high molecular weight polyarylmethanes such as polybenzylbenzenes and polymethylbenzylbenzenes having the general formula:

wherein A is a monovalent aryl group such as phenyl, tolyl, xylyl, naphthyl and the like, Ar is a divalent arylene group such as phenylene, tolylene, xylene, naphthylene and the like and generally corresponds to A, and $n$ is an integer greater than zero, generally 1 to 4. Depending upon the severity of reaction conditions, the polyarylmethanes can be present in an amount up to about equal to the weight of the desired diarylmethane to about only 10 to 20% by weight of the desired diarylmethane. The diarylmethanes are useful reactants; for example, they are employed to prepare benzophenone for example from diphenylmethane, di(carboxyphenyl)ketones from ditolylmethanes and bis(dicarboxyphenyl) ketones from dixylylmethanes, as well as being useful as plasticizers, intermediates for the manufacture of perfumes, dyes, pharmaceuticals, pesticides and plastics. Thus, the conversion of the aromatic reactants used in the preparation of diarylmethanes to the high molecular weight by-products has represented not only a loss of reactants but also resulted in a loss of yield of the desired diarylmethane.

We have discovered that the polyarylmethane by-products of the preparations of diarylmethanes can readily be converted to diarylmethanes by reacting them with an aromatic hydrocarbon in the presence of a Lewis acid. Generally, it is desirable to employ as the aromatic hydrocarbon reactant the same aromatic hydrocarbon employed originally for preparing the diarylmethane. However, this is not critical to the process of this invention, for, if a different aromatic hydrocarbon is employed, a mixed diarylmethane will be formed. It is preferred, therefore, to employ the same aromatic hydrocarbon so that the ultimate yield of the first prepared diarylmethane may be increased.

More specifically, the process of this invention is carried out by reacting a polyarylmethane of the formula:

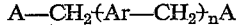

wherein A, Ar and $n$ have the same significance as hereinbefore noted, with an aromatic hydrocarbon corresponding to A in this formula at a temperature above the solidification temperature of the mixture up to the boiling point of the mixture or above, preferably at 40 to 80° C. The reaction is carried out in the presence of a Lewis acid in a catalytically effective amount, 0.001 to 5.0% by weight based on the polyarylmethane. When the reaction is carried out above the boiling point of the reaction mixture, elevated pressure may be employed; however, the use of elevated pressure is not critical to the process of this invention, for it appears to neither enhance nor suppress the reaction. It is preferred to conduct the reaction at atmospheric pressure, although pressures of from 1 to 100 atmospheres can be employed.

The process of this invention can be carried out with any ratio of high molecular weight polyarylmethanes to aromatic hydrocarbon. Maximum yields of the desired diarylmethane are obtained at high ratios of aromatic hydrocarbon to polyarylmethanes. More specifically, it is desirable to employ the aromatic hydrocarbon in ratios of from 5 to 100 moles per mole of polyarylmethanes, and it is preferred to employ the aromatic hydrocarbon in ratios of 10 to 20 moles per mole of polyarylmethanes.

Specific applications of the process of this invention include the following cases. In the preparation of diphenylmethane either by the condensation of benzene with formaldehyde in the presence of p-toluene sulfonic acid or by the condensation of benzyl chloride with benzene in the presence of aluminum chloride, ferric chloride and the like, there remains after the removal of benzene and diphenylmethane by distillation of the reaction mixture after removal of the catalyst, a high boiling residue, a bottoms which is mainly dibenzylbenzene,

and perhaps some di-benzyl diphenylmethane,

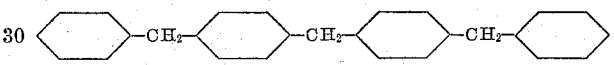

and even higher molecular weight polyarylmethanes. This residue may be separated further by fractionation to obtain dibenzylbenzene, leaving the high molecular weight materials as a residue. Then each fraction will be reacted with benzene according to the process of this invention. However, the first bottoms fraction containing the mixture of polyarylmethanes can be reacted with benzene according to the process of this invention to produce diphenylmethane. In a similar manner the polyarylmethanes bottoms remaining after the recovery of ditolylmethane are reacted with toluene according to the process of this invention to produce more ditolylmethane. The bottoms from the recovery of di-p-xylylmethane, di-1,2,4-(trimethylphenyl) methane, di(biphenylmethane), dinaphthylmethane, di(1-methylnaphthyl) methane, etc. can be reacted with p-xylene, psuedocumene, biphenyl, naphthalene, etc., respectively, to reduce more of each of the respective diarylmethanes.

In the process of this invention such Lewis acids as aluminum chloride or hydrogen fluoride can be employed as well as aluminum amalgam, in which case a small amount of HCl or HBr is added.

The following examples are given to illustrate the mode of operation of the process of this invention.

*Example 1*

The aromatic mixture obtained after washing p-toluene sulfonic acid with water from the reaction mixture resulting from reacting 552 grams (6.0 moles) toluene with 60 grams (2.0 moles) trioxymethylene is distilled to remove unreacted toluene. The toluene-free mixture is fractionated under reduced pressure. The first fraction, ditolylmethane, boiling point 93–94° C. at 0.15 mm. ($n_D^{20}$ 1.5660) is recovered in a yield of 130 grams. The bottoms in the still pot are further fractionated to recover 47 grams of a material, probably di-methyl-benzyl toluene, boiling at 182–187° C. at 0.15 mm. Hg ($n_D^{20}$ 1.5925). The residue amounts to 100 grams.

A mixture of 75 grams of the fraction boiling at 182–187° C. at 0.15 mm. Hg, 460 grams (5.0 moles) toluene, and 1.0 gram anhydrous aluminum chloride is heated at 70–80° C. for two hours. The reaction mixture turns black. Thereafter the reaction mixture is washed with water, dried over sodium sulfate and then fractionated. The main product, 70 grams boiling at 91 to 93° C. at 0.15 mm. Hg ($n_D^{20}$ 1.5665) is ditolylmethane, about 55% of first product. There remains about 15 grams of high boiling bottoms.

A mixture of 60 grams of the 100 grams of non-distillable residues from the first-mentioned fractionation, 460 grams toluene and 1.0 gram anhydrous aluminum chloride is heated at 70° to 80° C. for two hours. When the reaction mixture turns black, it is washed with water, dried over sodium sulfate and fractionated. The first fraction boiling at 90–92° C. and 0.2 mm. Hg ($n_D^{20}$ 1.5663) amounts to 60 grams of ditolylmethane.

In all, 266 grams, about 1.37 moles, of ditolylmethane are produced utilizing the process of this invention in combination with the formaldehyde-toluene condensation. The additional ditolylmethane produced by the process of this invention, 136 grams, represents an additional yield of more than 100% of the yield from the condensation process.

*Example II*

Still bottoms remaining after the recovery of di(ortho-xylyl) methane by fractionally distilling the hydrocarbon mixture resulting from the condensation of o-xylene (696 grams) with 45 grams para-formaldehyde, amounted to 125 grams. The di (ortho-xylyl) methane boiling at 113–115° C. at 0.020 mm. Hg ($n_D^{20}$ 1.5672) amounted to 125 grams.

A slow stream of hydrogen chloride gas is passed through a mixture heated to 70° C. which contains 60 grams (of the 125 grams) xylene-formaldehyde still bottoms, 530 grams (5.0 moles) ortho-xylene and 2.0 grams freshly prepared aluminum amalgam for two hours. The reaction mixture turns black. The aluminum amalgam is removed, the reaction mixture is washed with water and dried over sodium sulfate. The washed, dried mixture of hydrocarbons is fractionally distilled. A fraction boiling at 118–120° C. and 0.22 mm. Hg ($n_D^{20}$ 1.5662), di (o-xylyl) methane amounting to 55 grams is recovered. Conversion of the remaining 65 grams of the still bottoms in the same manner produces 60 grams additional di (o-xylyl) methane for a total of 115 grams of di (ortho-xylyl) methane in addition to the 125 grams first produced. The co-action of the combined processes produced 192% more di-(ortho-xylyl) methane than the formaldehyde-ortho-xylene condensation produced.

*Example III*

Dibenzylbenzene, 129 grams (0.5 mole) obtained as a residue from the recovery of diphenylmethane produced by the condensation of benzene with benzyl chloride in the presence of 5 grams of ferric chloride, may be converted to diphenylmethane by reacting with 585 grams (7.5 moles) benzene and 2 grams anhydrous aluminum chloride at 80° C. in yields comparable to those of the preceding examples.

*Example IV*

Di(monochlorobenzyl) chlorobenzene, 99 grams (about 0.2 mole) may be converted to di(monochlorophenyl) methane in high conversions by reacting with 450 grams (about 4 moles) chlorobenzene at 135° C. in the presence of 3 grams anhydrous aluminum chloride.

Although the preferred use of aluminum chloride, the preferred Lewis acid, is in the range of 1 to 4% by weight based on the polyarylmethanes, other of the weaker Lewis acids, such as zinc chloride, antimony pentachloride, titanium tetrachloride, beryllium chloride, stannic chloride and the like may be used in the same 1 to 4% range, preferably at the higher end, say 4 to 5% by weight. The weaker the Lewis acid with respect to AlCl₃, the longer will be the reaction time to produce results equivalent to those obtained by the use of AlCl₃ at the same reaction temperature. This, of course, can be compensated for by increasing the reaction temperature.

What is claimed is:

1. The process for preparing diarylmethanes which comprises reacting a polyarylmethane having the formula: A—CH₂(Ar—CH₂)ₙA wherein A is an aryl group, Ar is a divalent arylene group corresponding to A and n is an integer from 1 to 4 and wherein A and Ar are selected from the class consisting of aryl and arylene hydrocarbon groups and halogenated derivatives thereof with an aromatic compound corresponding to the aryl group A in the presence of a catalytically effective amount of a Lewis acid and recovering the diarylmethane formed.

2. The process of claim 1 wherein the Lewis acid is anhydrous aluminum chloride.

3. The process of claim 1 wherein the Lewis acid is ferric chloride.

4. The process of claim 1 wherein the reaction is carried out at a temperature in the range of from the freezing point up to the boiling point of the reaction mixture.

5. The process of claim 1 wherein the catalytically effective amount is 0.001 to 5% by weight based on the polyarylmethanes.

6. The process for the preparation of diphenylmethane which comprises reacting a polybenzylated benzene with benzene at a temperature of from 40 to 80° C. in the presence of from 1 to 4% by weight anhydrous aluminum chloride based on the polybenzylated benzene and recovering the diphenylmethane formed.

7. The process for the preparation of ditolylmethane which comprises reacting a poly (methylbenzylated) toluene with toluene in the presence of 1 to 4% by weight anhydrous aluminum chloride based on the poly (methylbenzylated) benzene at 70° to 80° C. and recovering ditolylmethane formed.

8. The process for the preparation of di-xylylmethanes which comprises reacting a poly (dimethylbenzylated) xylene with a xylene in the presence of 1 to 4% by weight anhydrous aluminum chloride based on the poly (dimethylbenzylated) xylene at the boiling point of the reaction mixture, and recovering the di-xylylmethane formed.

9. The process of claim 8 for producing di-p-xylylmethane wherein the poly (dimethylbenzylated) xylene is a poly (p-dimethylbenzylated) p-xylene and the xylene is p-xylene.

10. The process for the preparation of di-monochlorophenylmethane which comprises reacting poly (monochlorobenzyl) monochlorobenzene with chlorobenzene in the presence of 1 to 4% by weight anhydrous aluminum chloride based on the poly (monochlorobenzyl) monochlorobenzene at the boiling point of the reaction mixture, and recovering di-monochlorophenylmethane formed.

References Cited in the file of this patent

UNITED STATES PATENTS

| | | |
|---|---|---|
| 2,548,982 | Kemp | Apr. 17, 1951 |
| 2,623,910 | Robinson et al. | Dec. 30, 1952 |
| 2,897,245 | Fetterly | July 28, 1959 |

FOREIGN PATENTS

| | | |
|---|---|---|
| 204,735 | Australia | Dec. 4, 1956 |

UNITED STATES PATENT OFFICE
CERTIFICATE OF CORRECTION

Patent No. 3,043,886             July 10, 1962

Carl Serres, Jr., et al.

It is hereby certified that error appears in the above numbered patent requiring correction and that the said Letters Patent should read as corrected below.

Column 3, line 15, for "60" read -- 66 --; line 30, for "0.020" read -- 0.20 --; same column 3, line 41, for "0.22" read -- 0.2 --.

Signed and sealed this 26th day of March 1963.

(SEAL)
Attest:

ESTON G. JOHNSON
Attesting Officer

DAVID L. LADD
Commissioner of Patents